Figure 1:
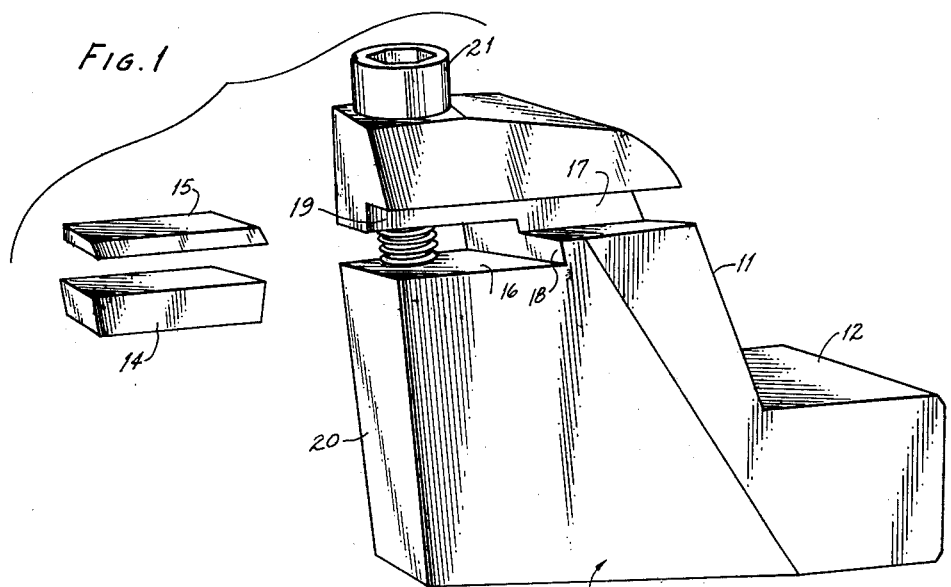

March 10, 1964   F. J. WILSON, JR   3,123,896
TOOL BITS AND HOLDERS FOR METAL WORKING TOOLS
Filed Sept. 26, 1962   4 Sheets-Sheet 1

FREDERICK J. WILSON, JR.
INVENTOR.

BY *Albert Sperry*
ATTORNEY

March 10, 1964 F. J. WILSON, JR 3,123,896
TOOL BITS AND HOLDERS FOR METAL WORKING TOOLS
Filed Sept. 26, 1962 4 Sheets-Sheet 2
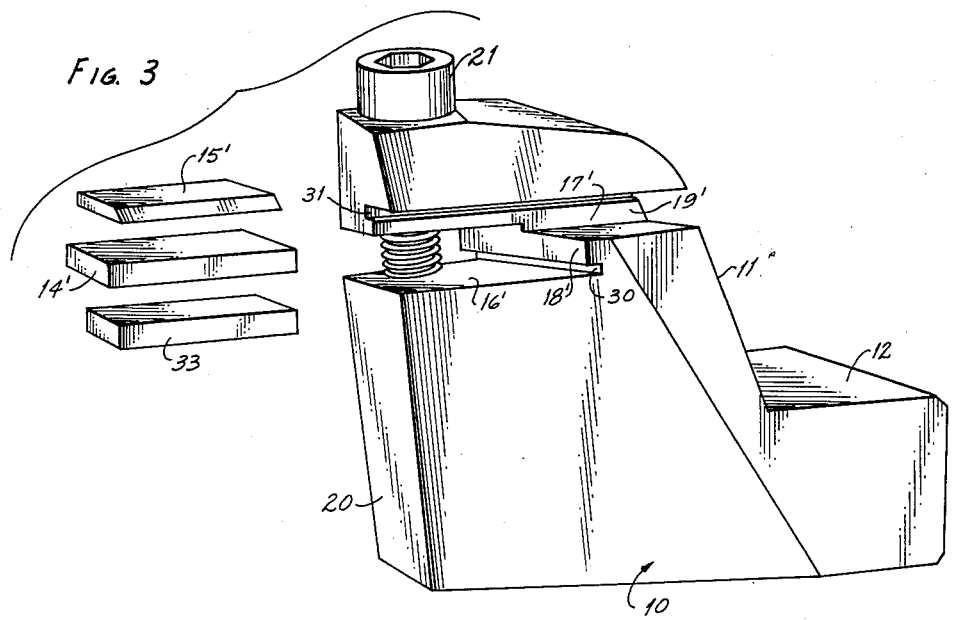
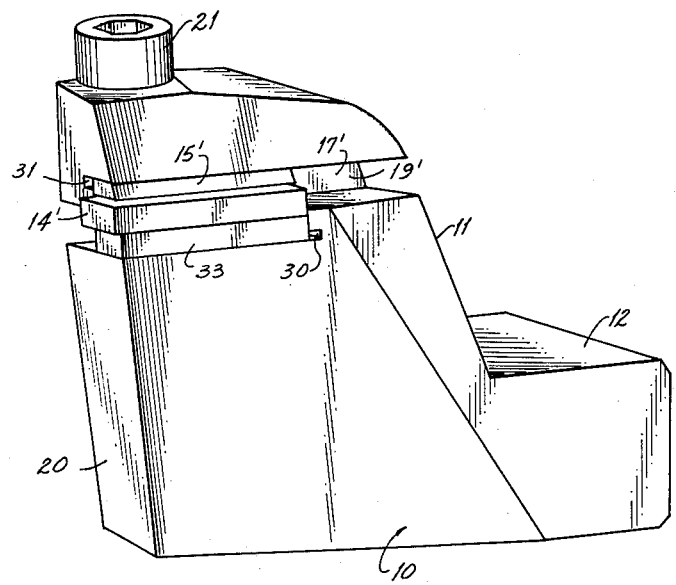
FREDERICK J. WILSON, JR.
*INVENTOR.*
BY *Albert S Perry*
*ATTORNEY*

March 10, 1964     F. J. WILSON, JR     3,123,896
TOOL BITS AND HOLDERS FOR METAL WORKING TOOLS
Filed Sept. 26, 1962     4 Sheets-Sheet 3

FREDERICK J. WILSON, JR.
INVENTOR.

BY *Albert Sperry*

ATTORNEY

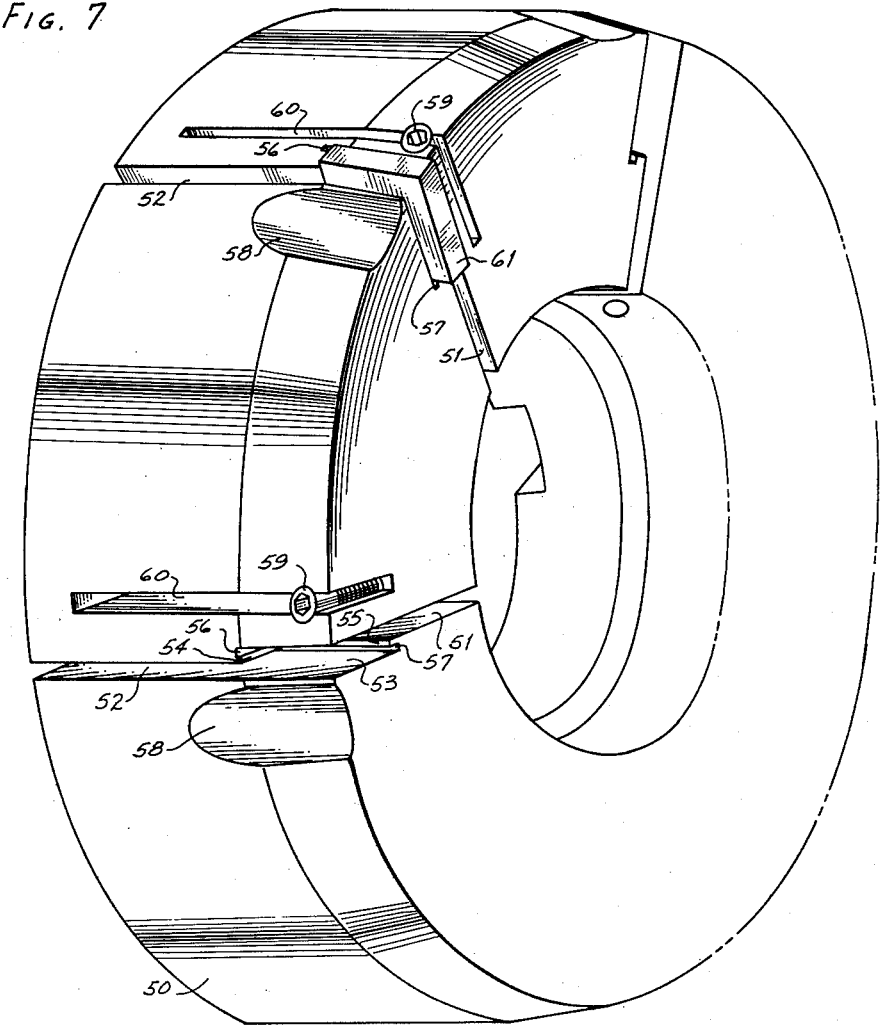

United States Patent Office 3,123,896
Patented Mar. 10, 1964

3,123,896
TOOL BITS AND HOLDERS FOR METAL
WORKING TOOLS
Frederick J. Wilson, Jr., 57 Franklin St., Ansonia, Conn.
Filed Sept. 26, 1962, Ser. No. 226,369
4 Claims. (Cl. 29—96)

This invention relates to tool bit holders and tool bit combinations therewith for use in machine tools for metal working operations. In both milling cutters and single point tools there is today an increasing trend towards the use of "throwaway" cutting elements usually in the form of thin, flat, generally rectangular or triangular pieces of carbide or equivalent hard cutting materials.

In the use of such devices, the tool bit may be turned or indexed in the holder or milling cutter slot to successively present the different edges in cutting position. As with all metal working tools, one of the important problems is the securement of the cutting element, which must be locked in predetermined cutting position and firmly secured against possibility of vibration or chatter, and supported by ample thickness of material to provide adequate backup to sustain the cutting element during its cutting operation. An equally important problem is to readily dispose and secure the cutting edge at an efficient and effective extension from the holder body and at an appropriate angle, so as to insure a proper rake and clearance angle, and for proper chip disposition. Both of these problems are accentuated because of the small size of the "throwaway" bits above referred to, and by the angular character of the bits, providing for rotation or indexing to present different cutting edges to the work.

It has been proposed that automatic accurate location of the bit may be provided by forming bit receiving recesses by the formation of a compound slot constituted by two angularly related and juxtaposed slots opening toward each other and communicating with each other. The width of the compound slot at the juncture of the individual slots is equal to the width of the bit. This arrangement thus provides angularly related shoulders, one for each slot, and thus by the insertion of a bit, one shoulder engages one portion of one edge, as for instance approximately one-half thereof, to seat the bit with respect to one side edge, while the other shoulder engages an adjacent edge of the bit to locate it with respect to a second angle. Such an arrangement is effective and efficient in locating of "throwaway" and indexible single point holders or bits in milling machine cutters.

Serious difficulties are involved however, due to the fact that the edges not in cutting position may bear against the shoulders, tending to mutilate the non-used edges of the bit, militating against or destroying their usefulness when the bit is indexed to expose such edges for cutting position. This difficulty is particularly true where the slots formed in the holding device are not exactly square and where radii are permitted at the corners. The formation of a slot by conventional present day manufacturing methods does not insure accurate corners against which the bit edge may be disposed without danger to a destruction of the cutting quality thereof, or the loss of accurate and substantial seating ability.

Another problem encountered in the formation of a bit holder in this manner, is that since the maximum width of the compound inter-related grooves is equal to the width of the bit to be received therein, no provision is made for the reception with the bit of anvils, chip breakers, wedges, or the like.

Figure 2:
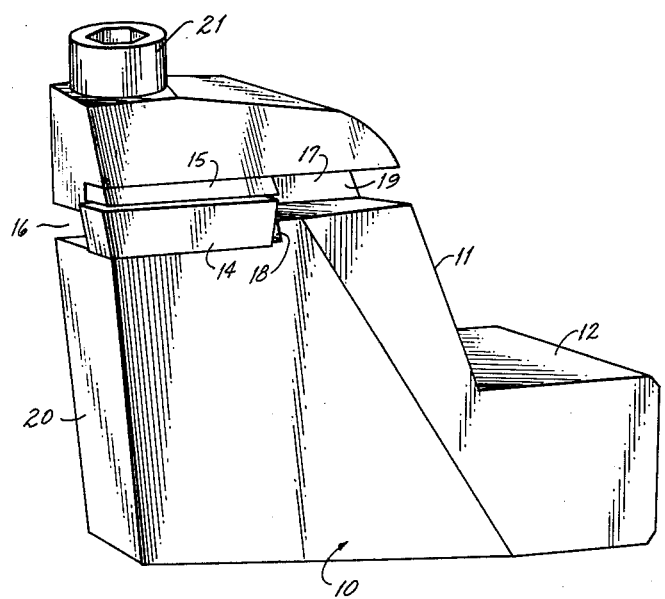
Figure 5:
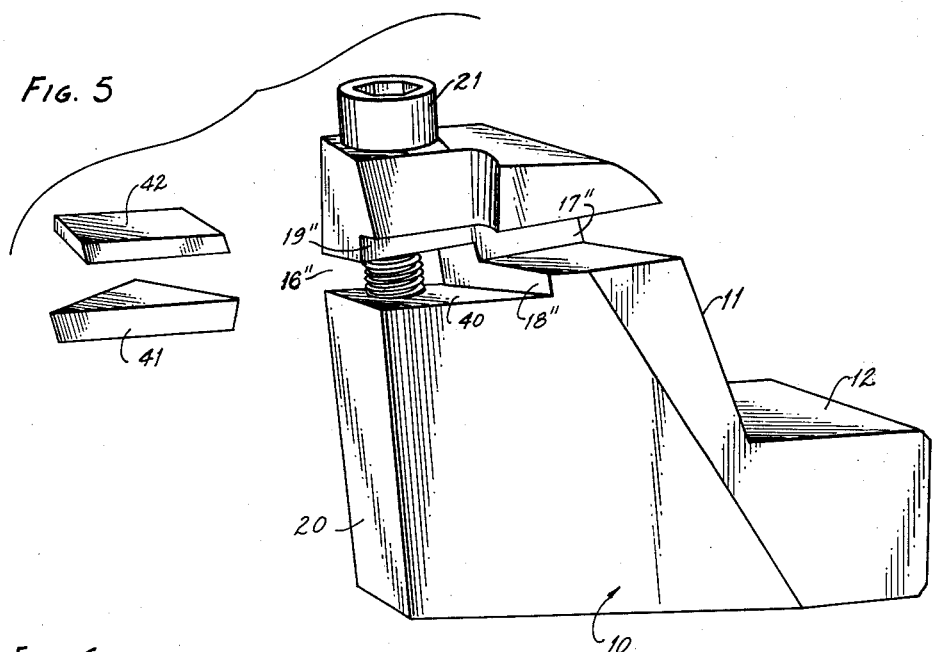
Figure 6:
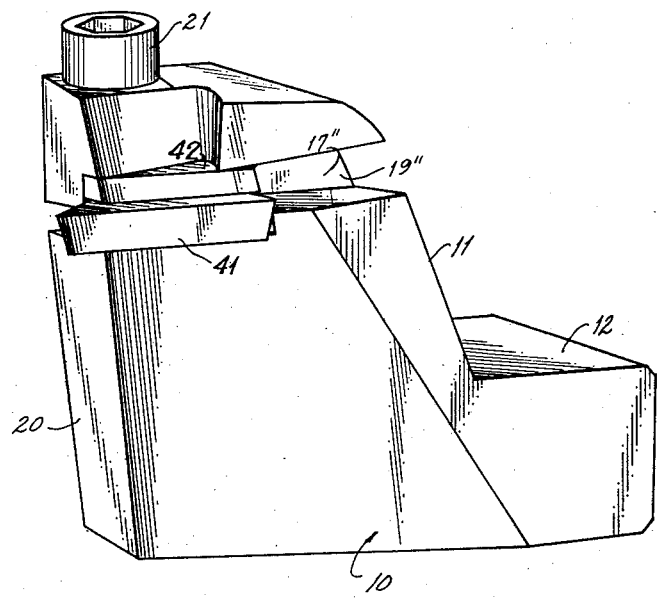

Broadly, it is an object of the present invention to provide a novel and improved means for mounting "throwaway" bits in holders for the indexible disposition of such bits for metal cutting operations. More specifically, it is an object of the invention to provide a novel and improved bit holding means incorporating the use of angularly related mutually open receiving slots for cutting tool bits. A further object, is to provide for combined slots so formed as to avoid the danger of mutilation of bit edges which are received within such slots and to insure proper definite location of the bit in the holder. Another object is to provide a slot arrangement of the character set forth, amenable to the reception of accessory elements in connection with the bit, as for the reception of anvils and/or chip breakers. Numerous other objects, features and advantages of the present invention will be apparent from a consideration of the following specification, taken in conjunction with the accompanying drawings, in which:

FIG. 1 is a perspective exploded view of a single point type tool bit holder formed in accordance with the present invention, FIG. 2 is a similar perspective view of the holder of FIGURE 1, with the bit and chip breaker in position, FIG. 3 is a view similar to FIGURE 1, showing an anvil and chip breaker with the bit and indicating a different form of bit edge relief, FIG. 4 is a view of that form of the invention shown in FIGURE 3 with bit, breaker and anvil in position, FIG. 5 is a perspective exploded view of a holder with a bit of triangular character, FIG. 6 is a perspective view of the device of FIGURE 5, showing the device with the chip breaker and bit in position, and FIG. 7 is a perspective view of a milling cutter formed in accordance with the present invention.

Referring now to FIGURES 1 and 2 of the drawings, the body of the bit holder, or locating tool, is generally indicated by the numeral 10 and is shown here as generally rectangular with an inclined inner wall 11 and an extension 12. This general rectangular configuration, the inclined wall 11 and the extension 12, form no part of the present invention. To those skilled in the art, it will be recognized that this construction provides for the mounting of the bit holder or locating tool, in suitable means of a metal working tool by which the bit is presented to the work piece, as for instance, a conventional tool holder. For receiving, retaining and locating, the disposable bit 14 and a chip breaker 15, that form of the invention shown in FIGURES 1 and 2 has the upper end of the body 10 furcated, being formed with a transverse slot 16 and a longitudinally extending slot 17. As indicated more clearly in FIGURE 1, the left hand end of the slot 17 merges with the forward end of the slot 16, the inner face of the slot 16 is terminated by a wall 18 while the inner face of the slot 17 is terminated by a longitudinally extending wall 19. An important feature of the present invention is the fact that the wall 18 is not perpendicular and parallel with the front face 20 of the body 10. Thus, as more clearly shown in FIGURE 2, the top edge of the wall 18 at its juncture with the lower face of the wall 19 forms an angle to engage a mid-section of the inner face of the bit 14. Thus, the lower corner edges of the bit are not forced against the wall 18 and are thus not subject to contact and abrasion. Further, since this angularity of the wall 18 provides a clearance at the lower portion, the bit may be fitted directly against the upper edge of the wall 18 and hence standard manufacturing processes may be used in forming slots. Such forming of the slots by normal methods could produce radii at the lower edge of the wall and might preclude the proper seating of the bit. Similarly, the wall 19 may be inclined so as to engage a midsection of the inner or longitudinal edge of the bit, without engaging the upper cutting edge, subjecting it to abrasion and wear and tending to induce an improper seating to the bit in its desired location.

Another important feature of the present invention is that the combined heights of the joining transverse and longitudinal slots are substantially greater than the thickness of the bit, so as to accommodate therewith a chip breaker indicated at 15. The retention of the combined bit and chip breaker, 14 and 15, is here shown by way of a conventional screw 21 which on tightening draws the upper portion of the locating tool downwardly to compress the slots 16 and 17. With respect to this aspect of the present invention, it will be understood that many and various securing locks for tools of this nature known to those skilled in the art, may be incorporated without departing from the inventive concept here set forth. In this form of the invention, it will be seen that the wall 18 constitutes the back locating wall for the bit, while the side location is maintained by the wall 19, the bit and breaker being substantially equal to the thickness of the two inter-related slots, both bit and breaker will be automatically properly located. The inclination of the walls 18 and 19 will preclude a mutilation of the cutting edges of the bit and insure a proper location even though there may be some imperfections in the manufacturing method used for forming the slots.

The general structure of the bit holder or locating tool, of FIGURES 3 and 4, is substantially that discussed with respect to FIGURES 1 and 2. In that form of the invention shown in FIGURES 3 and 4, the slot and wall arrangement is substantially as shown in FIGURES 1 and 2, as is the general configuration of the locater head. However, as distinct from the inclination of the walls 18 and 19, of FIGS. 1 and 2 the walls 18' and 19' of the slots 16' and 17' in the construction shown in FIGS. 3 and 4 are formed with terminal recesses 30 and 31 respectively, to accomplish a like function, namely, to relieve the walls so as to preclude injury at a cutting edge and to overcome roughness, radii or the like, which would injure the cutting edges or the sharp square outlines of bits, breakers or anvils. In this form of the invention there is in addition to the bit and breaker 14' and 15', an anvil 33', the total space formed by the slots being such as to accommodate these three pieces in unison.

With respect to that form of the invention illustrated in FIGURES 5 and 6 of the drawings, the transverse slot 16" forming the bit seat 40 merges with the sharply angled longitudinally extending slot 17". This provides for the reception and accurate location of a triangular disposable bit 41 which is preferably mounted in combination with a chip breaker 42. Since the conjunction of the walls 18" and 19" is sharply angular, as for instance at 60 degrees, a triangular bit will be secured, located and retained. However, as in other forms of the invention, the joint width of the inner communicating slots is greater than the combined thickness of the triangular bit 41 and chip breaker 42 which will thus be accommodated and will be located by the cooperating walls in the manner of location of both bit and chip breaker, as well as bit, chip breaker and anvil, in that form of the invention shown in FIGURES 1 to 4. Otherwise, the general structure of this form of the invention is in accordance with those already discussed. This is an example of the fact that the present invention is not limited to specific shapes and forms of bits, and square, rectangular, triangular, or other shaped bits may be utilized, as is here illustrated.

As illustrated in FIGURE 7, the present inventive concept is equally applicable for use in milling cutters, as well as in single point tools depicted in FIGURES 1 to 6. In this case a conventional circular milling body 50 is provided with inter-communicating radial slots 51 and peripheral transverse slots 52. At the juncture of these slots their inter-communication provides a bit locating and securing opening 53 bounded on two sides by the walls 54 and 55 formed by the juncture between the slots, offset but communicative. In this form of the invention the walls are recessed at 56 and 57 in the manner of the recesses of FIGURES 3 and 4 as and for the same purpose. In conventional fashion chip recesses are indicated at 58 and a tapered wedge screw 59 in an adjacent slot 60 provides for locking the bit 61 within the combined slots. Such locking means are of course conventional and other similar locking means may be substituted.

From the foregoing, it will be seen that the present invention provides a novel and improved disposable bit locating means by the use of inter-communicating angularly related slots, the terminal shoulders of which form angularly related walls for locating the inner edges of the disposable and indexible bits. Furthermore, the invention provides a formation of the walls with inclinations or recesses, so as to preclude damage to the cutting edges of the bits which are located by the walls. Not only are these inclinations and/or recesses of the wall arranged to protect the unused cutting edges of the indexible bits, but they further permit the use of conventional forming methods for cutting or grinding of the slots which may thus be rough, since the grooving or sloping of the bit seating walls avoids any radii, precluding the proper setting of the bit within the slot. Another feature of the invention is the formation of the slots of such width as to permit the use of the bit with chip breakers and/or anvils. It will be noted that conventional securing means for the bit and its assembly may be resorted to and that those skilled in the art may select various and different types of securing means from those here illustrated.

Thus, in the practice of the invention, numerous changes, modifications and the full use of equivalents may be resorted to without departing from the spirit or scope of the invention as outlined in the appended claims.

What I claim is:

1. The combination of a tool bit holder and a disposable tool bit comprising a holder body having intersecting angularly disposed slots formed in adjacent faces of the holder body, said slots being located in different planes and each having spaced parallel surfaces and an inner wall, the inner wall of each of said slots intersecting one of said surfaces of the other of said slots in the holder body and cooperating therewith to define a pair of angularly disposed tool bit seating and positioning shoulders extending outward from the point of intersection of said inner walls of said slots to the faces of said holder body in which said slots are formed, and a disposable tool bit in the form of an element having outer sides and substantially flat opposite surfaces together with cutting edges extending about the outer sides of the tool bit adjacent at least one of said flat surfaces of the tool bit, said tool bit being located in the intersecting portion of said slots and having adjacent outer sides thereof engaging said tool bit seating and positioning shoulders at points on said outer sides of the tool bit which are spaced from said flat opposite surfaces of the tool bit, the inner walls of said slots at opposite sides of said tool bit seating and positioning shoulders being spaced from said cutting edges of the tool bit, and clamping means carried by the tool bit holder body and extending across one of said slots adjacent the intersection thereof with the other slot in the body of the tool holder for urging the intersecting portions of said slots toward the flat faces of said tool bit and serving to hold the outer sides of the tool bit in engagement with said tool bit seating and positioning shoulders.

2. The combination of a tool bit holder and a disposable tool bit comprising a holder body having intersecting angularly disposed slots formed in adjacent faces of the holder body, said slots being located in different planes and each having spaced parallel surfaces and an inner wall, the inner wall of each of said slots intersecting one of said surfaces of the other of said slots in the holder body and cooperating therewith to define a pair of angularly disposed tool bit seating and positioning shoulders extending outward from the point of intersection of said inner walls of said slots to the faces of said holder body in which said slots are formed, and a disposable tool bit in the form of an element having outer sides and substantially flat opposite surfaces together with cutting edges extending about the outer sides of the tool bit adjacent at least one of said flat surfaces of the tool bit, said tool bit being located in the intersecting portion of said slots and having adjacent outer sides thereof engaging said tool bit seating and positioning shoulders at points on said outer sides of the tool bit which are spaced from said flat opposite surfaces of the tool bit, the inner walls of said slots at opposite sides of said tool bit seating and positioning shoulders being spaced from said cutting edges of the tool bit, clamping means carried by the tool bit holder body and extending across one of said slots adjacent the intersection thereof with the other slot in the body of the tool holder for urging the intersecting portions of said slots toward the flat faces of said tool bit and serving to hold the outer sides of the tool bit in engagement with said tool bit seating and positioning shoulders, the opposite surfaces of the tool bit being spaced apart a distance less than the width of the intersecting portions of said slot, and a chip breaker located in the intersecting portion of said slots and engaging one of the flat faces of said tool bit and one of the opposite surfaces of one of said slots, said chip breaker cooperating with said clamping means to hold the tool bit in place.

3. A tool holder comprising a body having two adjacent angularly related sides forming a corner on said body, each of said sides of the body having a slot therein extending to said corner, said slots each having parallel opposite side walls and an inner end wall, the slots being arranged in parallel planes and intersecting at said corner of the tool holder body to provide a tool receiving space presenting parallel faces spaced apart a distance greater than the width of either of said slots, the inner end wall of each of said slots being inclined with respect to the parallel opposite side walls of the slots and presenting a tool bit engaging and positioning shoulder projecting inwardly along adjacent sides of said tool bit receiving space, said shoulders extending along lines parallel to but spaced from the parallel faces of the tool bit receiving space in position to engage adjacent sides of a tool bit located in said space while providing a relief for the cutting edges of a bit adjacent the parallel faces of the tool bit receiving space.

4. The combination of a tool bit holder and a disposable tool bit comprising a holder body having intersecting angularly disposed slots formed in adjacent faces of the holder body, said slots being located in different planes and each having an upper and a lower surface located in parallel planes and an inner wall inclined with respect to said upper and lower surfaces of said slots, the intersecting inner wall portions cooperating to define tool bit seating and positioning shoulders extending from the point of intersection of said inner walls of said slots to the adjacent faces of said body and positioned between the upper and lower surfaces of said slots, and a tool bit in the form of an element having substantially flat parallel upper and lower surfaces with adjacent edges of the tool bit bearing against said tool bit seating and positioning shoulders at points on the edges of the tool bit spaced from the upper and lower edges of the tool bit, the inner walls of said slots above and below said tool bit seating and positioning shoulders being spaced from the edges of the tool bit adjacent the upper and lower surfaces of the tool bit, and means carried by the tool bit holder for holding said tool bit in engagement with said tool bit seating and positioning shoulders.

References Cited in the file of this patent

UNITED STATES PATENTS

| | | |
|---|---|---|
| 2,598,581 | McKenna | May 27, 1952 |
| 2,945,288 | Berry | July 19, 1960 |
| 2,967,442 | Forsyth | Jan. 10, 1961 |
| 3,050,828 | Cashman | Aug. 28, 1962 |
| 3,059,316 | Bader | Oct. 23, 1962 |
| 3,060,554 | Kirchmer | Oct. 30, 1962 |
| 3,066,385 | Vana | Dec. 4, 1962 |